(12) United States Patent
Crinon et al.

(10) Patent No.: US 6,259,828 B1
(45) Date of Patent: *Jul. 10, 2001

(54) SPRITE-BASED VIDEO CODING SYSTEM WITH AUTOMATIC SEGMENTATION INTEGRATED INTO CODING AND SPRITE BUILDING PROCESSES

(75) Inventors: Regis J. Crinon; Muhammed Ibrahim Sezan, both of Vancouver, WA (US)

(73) Assignee: Sharp Laboratories of America, Camas, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/493,410

(22) Filed: Jan. 28, 2000

Related U.S. Application Data

(62) Division of application No. 08/999,103, filed on Dec. 29, 1997.
(60) Provisional application No. 60/034,558, filed on Dec. 30, 1996.

(51) Int. Cl.[7] .................................................. G06K 9/54
(52) U.S. Cl. .................. 382/305; 382/232; 382/236; 382/276; 382/284; 348/588; 348/584; 348/598; 358/403; 358/450; 707/1; 707/3
(58) Field of Search ................................. 382/154, 232, 382/284, 305, 236, 240; 348/584, 586, 588, 598; 358/403, 404, 426, 450; 707/1, 3, 10

(56) References Cited

U.S. PATENT DOCUMENTS 5,649,032 * 7/1997 Burt et al. ............................ 382/284
5,686,956 * 11/1997 Oh et al. ................................ 348/19
5,692,063  11/1997 Lee et al. .

(List continued on next page.)

OTHER PUBLICATIONS

Irani, et al "Mosaic Based Representations of Video Sequences and Their Applications", IEEE pp. 605–611, 1995.*
Tannenboum, et al "Evaluation of A Mosaic Based Approach To Video Compression", IEEE, pp. 1213–1215, 1996.*
Dufaux, et al "Background Mosaicking For Low Bit Rate Video Coding", IEEE, pp. 673–676, Sep. 1996.*
Song, et al. "Personal Identification by Image–Processing Sequential Images of Human Face", IEEE, pp. 963–967, 1994.*
*Video Compression Using Mosaic Representations* by M. Irani, S. Hsu and P. Anandan, Signal Processing Image Communication, Nov. 1995, No. 4/6.

(List continued on next page.)

*Primary Examiner*—Leo Boudreau
*Assistant Examiner*—Daniel G. Mariam
(74) *Attorney, Agent, or Firm*—Marger Johnson & McCollom, PC; Stephen S. Ford

(57) ABSTRACT

A sprite-based coding system includes an encoder and decoder where sprite-building is automatic and segmentation of the sprite object is automatic and integrated into the sprite building as well as the coding process. The sprite object is distinguished from the rest of the video objects on basis of its motion. The sprite object moves according to the dominant component of the scene motion, which is usually due to camera motion or zoom. Hence, the sprite-based coding system utilizes dominant motion, to distinguish background images from foreground images. The sprite-based coding system is easily integrated into a video object-based coding framework such as MPEG-4, where shape and texture of individual video objects are coded separately. The automatic segmentation integrated in the sprite-based coding system identifies the shape and texture of the sprite object

8 Claims, 11 Drawing Sheets

U.S. PATENT DOCUMENTS

| | | | | |
|---|---|---|---|---|
| 5,778,098 | * | 7/1998 | Lee et al. | 382/236 |
| 5,782,642 | * | 7/1998 | Goren | 434/307 R |
| 5,896,176 | * | 4/1999 | Das et al. | 348/416 |
| 5,943,445 | * | 8/1999 | Dufaux | 382/236 |
| 5,956,026 | * | 9/1999 | Ratakonda | 345/328 |
| 5,956,716 | * | 9/1999 | Kenner et al. | 707/10 |
| 5,963,664 | * | 10/1999 | Kumar | 382/154 |
| 5,991,444 | * | 11/1999 | Burt et al. | 382/232 |
| 5,999,662 | * | 12/1999 | Burt et al. | 382/284 |

OTHER PUBLICATIONS

*Image Mosaicing for Tele–Reality Applications* by R. Szeliski, Proceedings of the Second IEEE Workshop on Applications of Computer Vision, Dec. 5–7, 1994, pp. 44–53.

*Representing Moving Images with Layers* by J. Wang and E. Adelson, IEEE Transactions on Image Processing, Sep. 1994, vol. 3, No. 5.

* cited by examiner

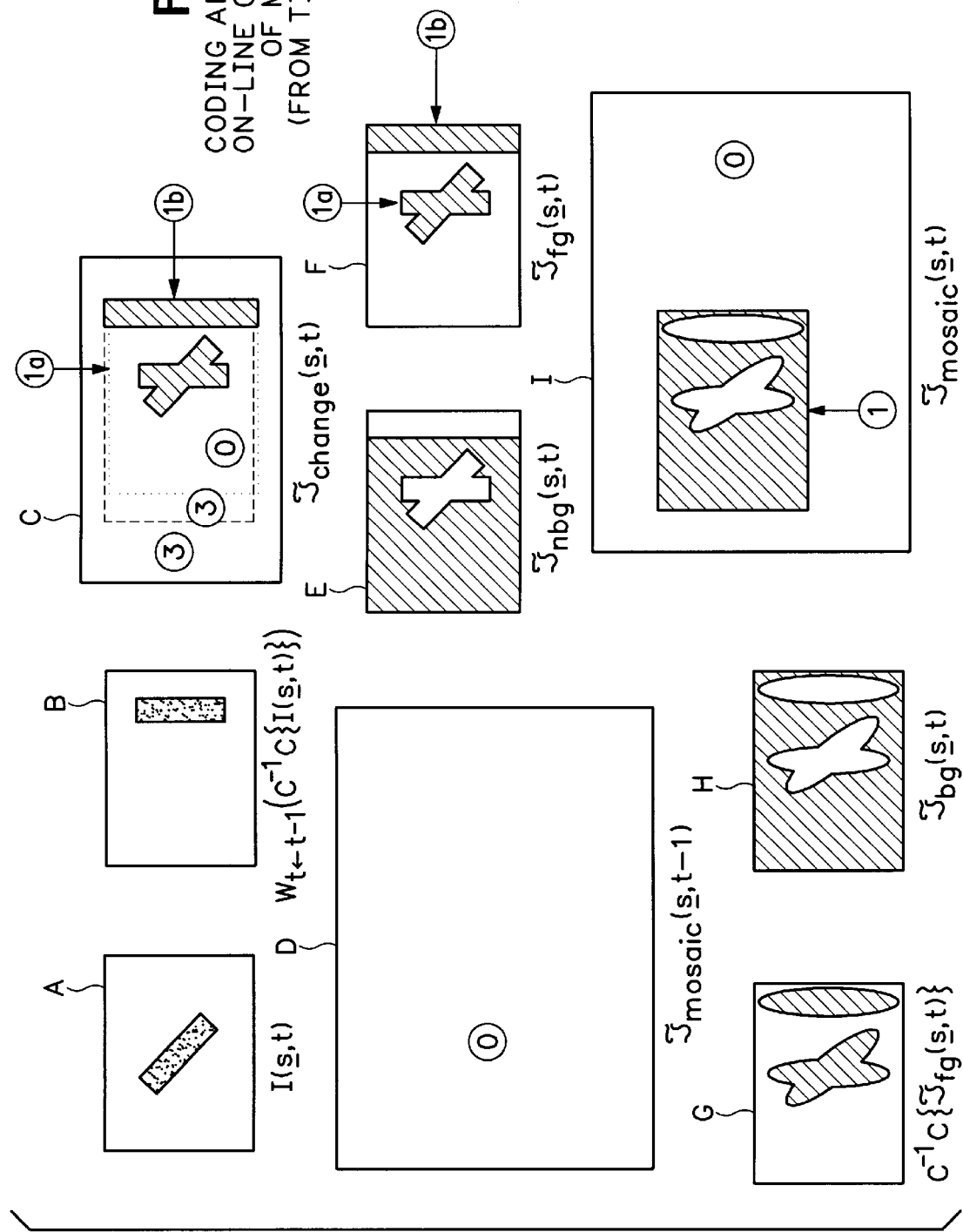

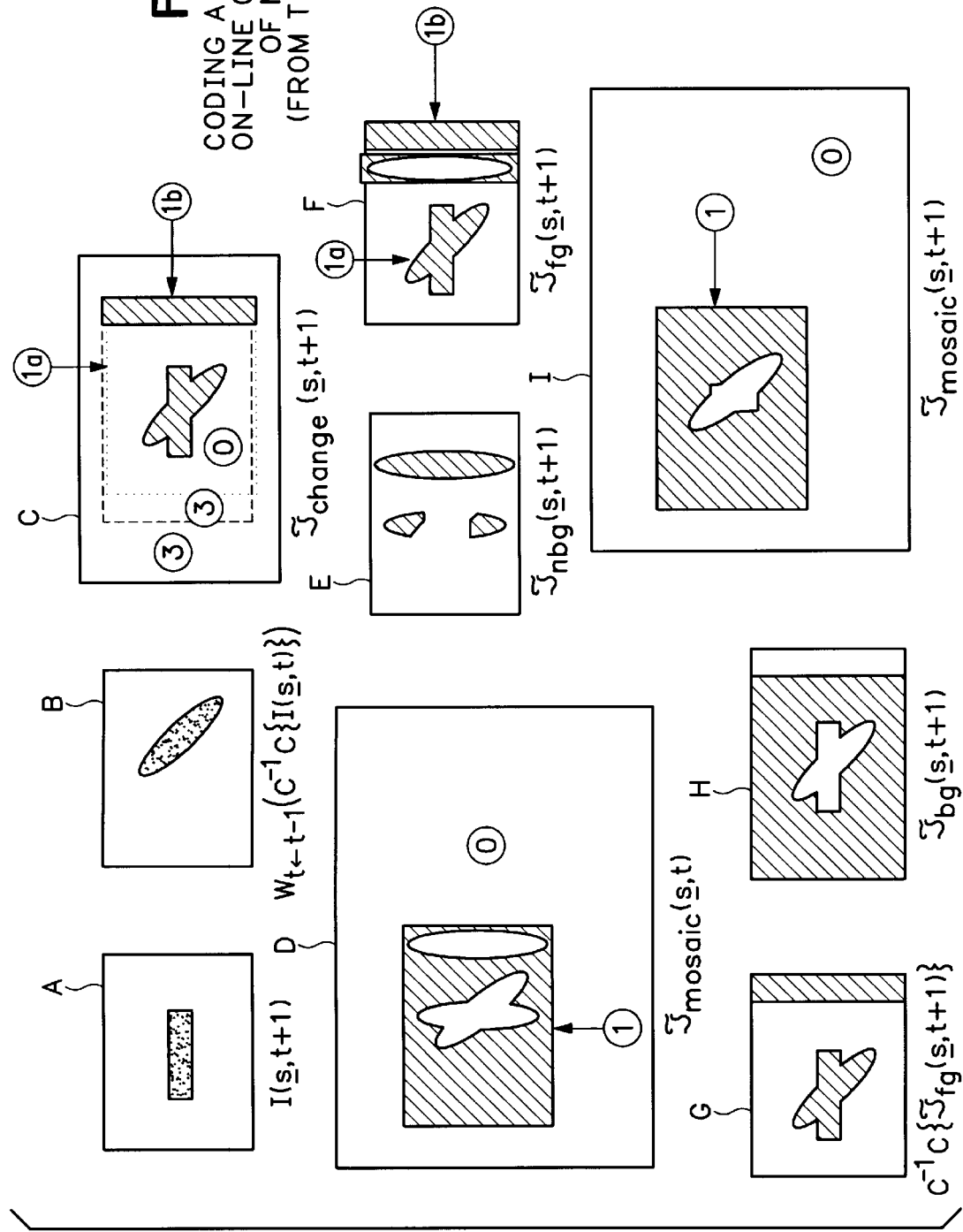

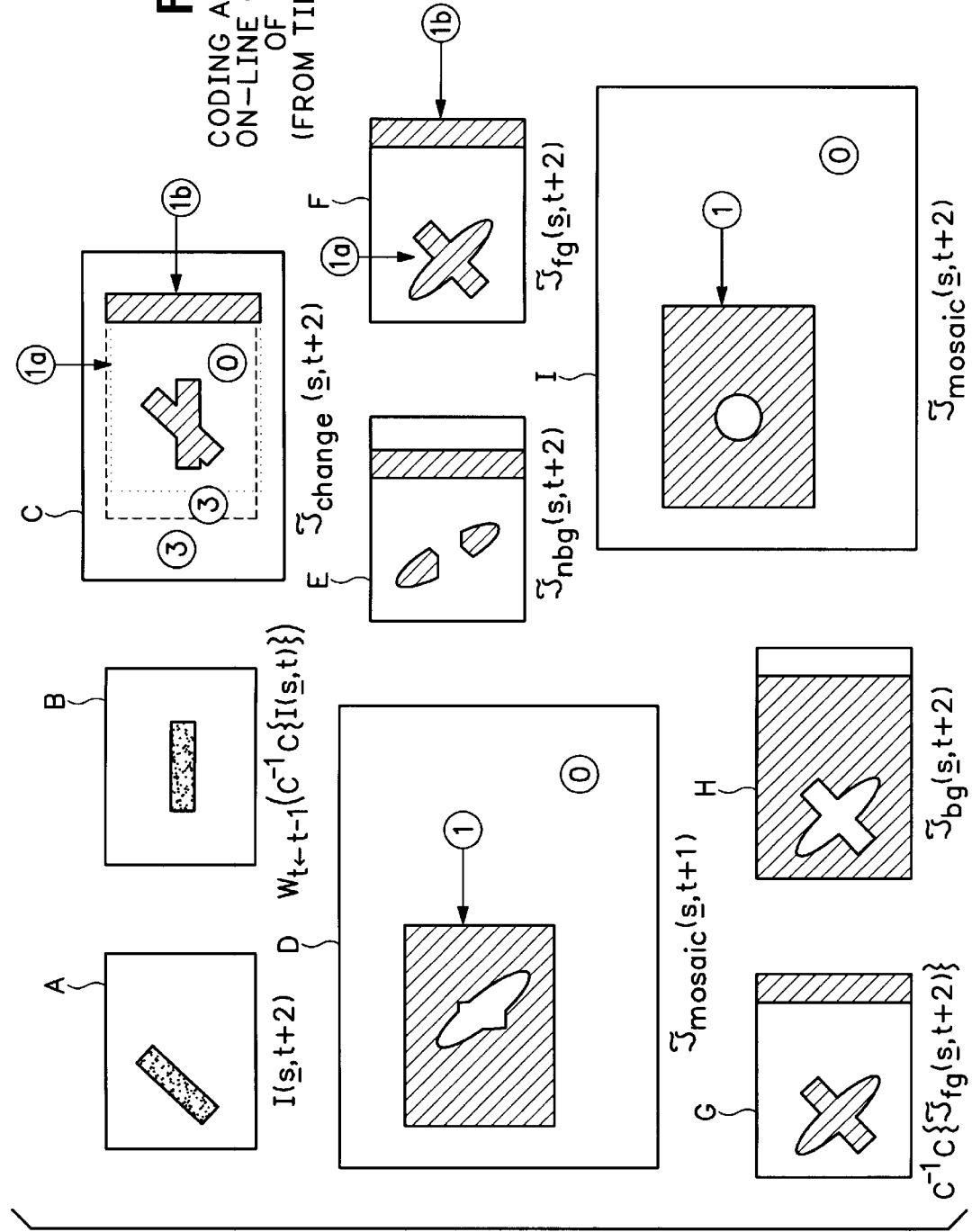

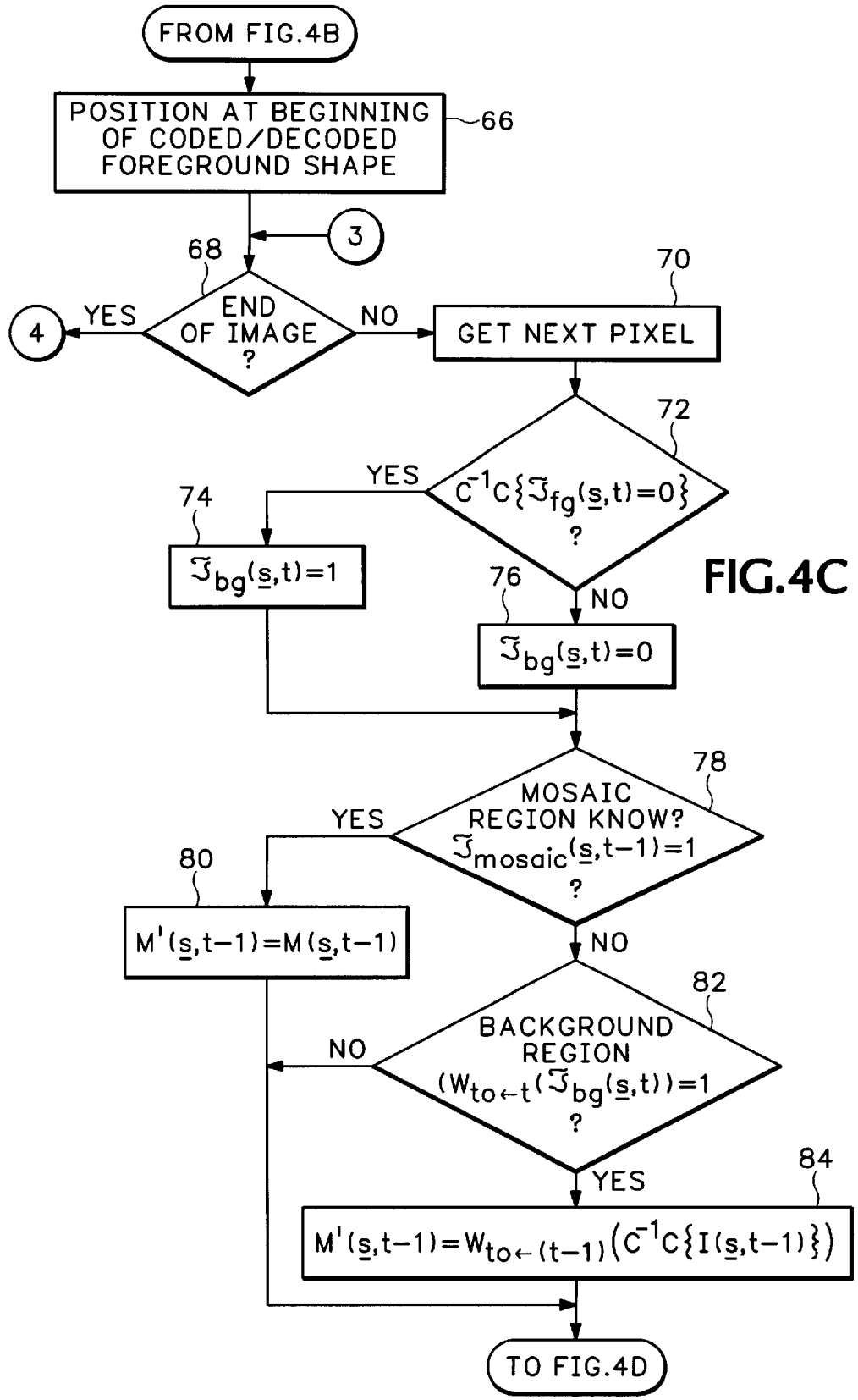

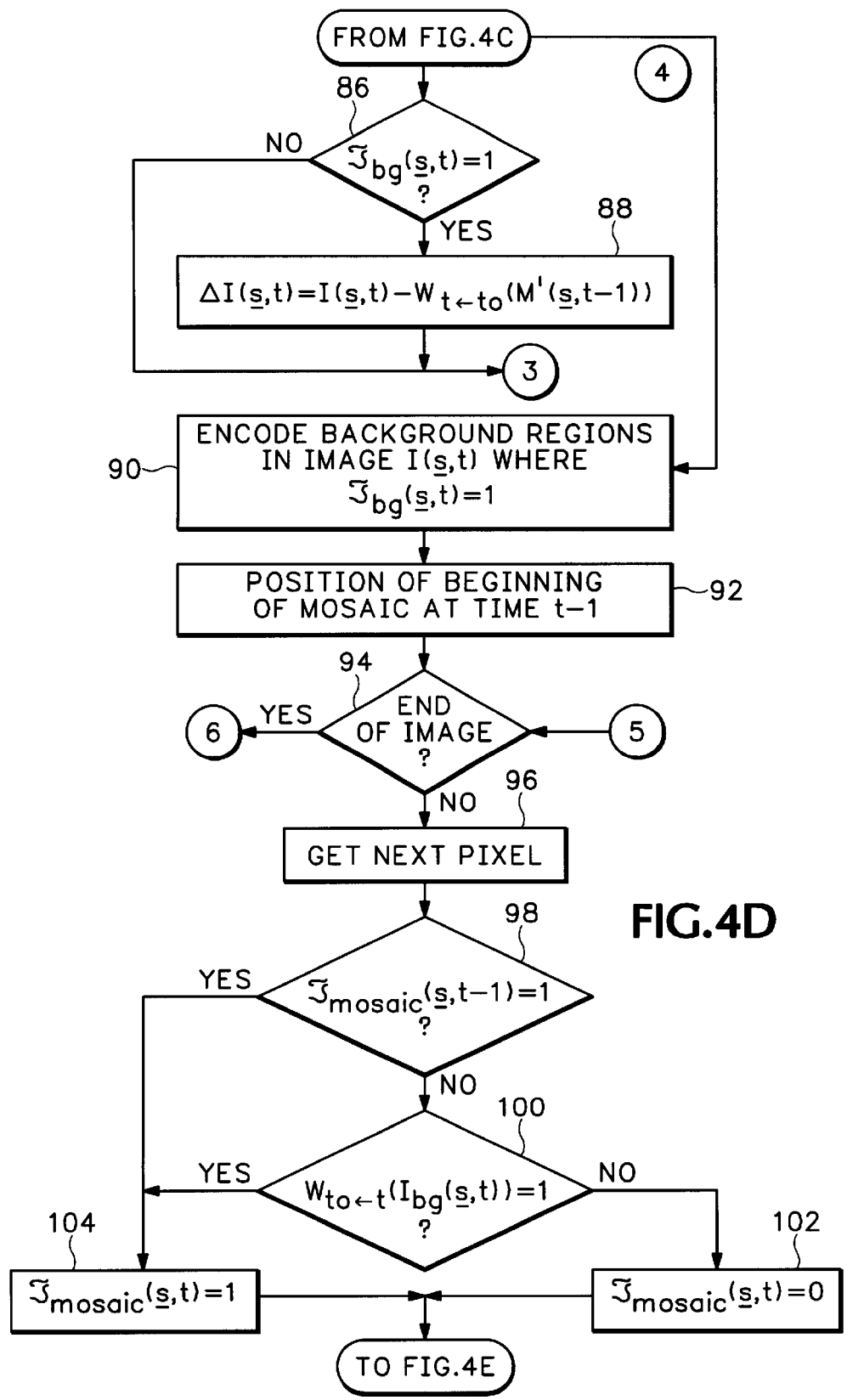

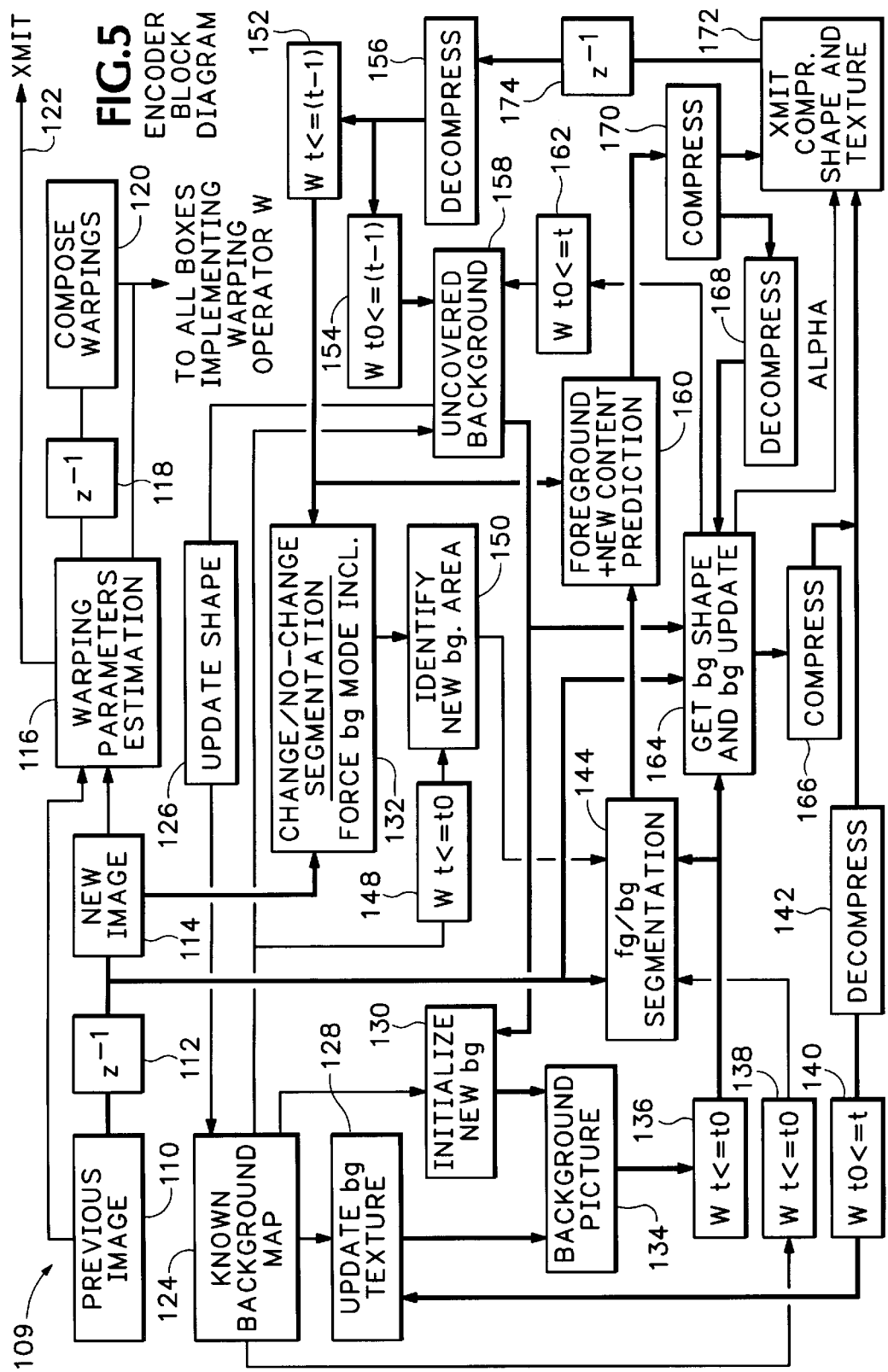
FIG.5 ENCODER BLOCK DIAGRAM

SPRITE-BASED VIDEO CODING SYSTEM WITH AUTOMATIC SEGMENTATION INTEGRATED INTO CODING AND SPRITE BUILDING PROCESSES

This is a division of application Ser. No. 08/999,103 filed Dec. 29, 1997, which was based on Provisional Application No. 60/034,558, filed Dec. 30, 1996.

BACKGROUND OF THE INVENTION

The invention relates to a sprite-based encoder (encoder and decoder that automatically builds a sprite (also called a mosaic) while operating in a separate shape/texture coding environment such as MPEG-4 and novel applications that utilize the mosaic.

A mosaic image (the term's mosaic and sprite are used interchangeably) is built from images of a certain scene object over several video frames. For instance, a mosaic of a background scene in the case of a panning camera will result in a panoramic image of the background. Two major types of sprites and sprite-based coding are defined in MPEG-4. The first type of mosaic is called an off-line static sprite. An off-line static sprite is a panoramic image which is used to produce a sequence of snapshots of the same video object (such as background). Each individual snapshot is generated by simply warping portions of the mosaic content and copying it to the video buffer where the current video frame is being reconstructed. Static sprites are built off-line and are transmitted as side information.

The second type of mosaic is called an on-line dynamic sprite. On-line dynamic sprites are used in predictive coding of a video object. A prediction of each snapshot of the video object in a sequence is obtained by warping a section of the dynamic sprite. The residual signal is coded and used to update the mosaic in the encoder and the decoder concurrently. The content of a dynamic mosaic may be constantly updated to include the latest video object information. As opposed to static sprites, dynamic sprites are built on line simultaneously in the encoder and decoder. Consequently, no additional information needs to be transmitted besides mosaic dimensions, a blending factor and the global motion parameters.

Both off-line static and on-line dynamic sprite-based coding require constructing a sprite. In the former case, the sprite is built prior to transmission. In the later case, the sprite is built on-line during the transmission. So far, MPEG-4 has assumed that the outline (segmentation) of the object for which the sprite is going to be built is known a-priori at every time instant. Although this is true in certain applications, especially in post-production or content generation using blue screen techniques, automatic segmentation does not currently exist for sprites built dynamically in encoding environments.

Therefore a need remains for sprite-based coding systems where sprite building does not require a-priori knowledge of scene segmentation.

SUMMARY OF THE INVENTION

A sprite-based coding system includes an encoder and decoder where sprite-building is automatic and segmentation of the object used to reconstruct the mosaic is automatic and integrated into the coding process. The sprite object is distinguished from the rest of the video objects on basis of its motion. The sprite object moves according to the dominant component of the scene motion, which is usually due to camera motion or zoom. Hence, the sprite-based coding system utilizes dominant motion to distinguish the background object in the image from foreground objects in the image. The sprite-based coding system is easily integrated into a video object-based coding framework such as MPEG-4, where shape and texture of individual video objects are coded separately. The automatic segmentation integrated in the sprite-based coding system identifies the shape and texture of the sprite object.

In one application, the sprite-based encoding/decoding system builds a background mosaic off-line prior to the bi-directional transmission of conversational and visual data The initial mosaic reconstruction phase provides both the videophone encoder and decoder the opportunity to build either a partial or a complete representation of the background behind the videophone user. In a second phase the videophone supports a conversational service between two videophone users and the mosaic is used by the videophone encoder and decoder to implement mosaic-based predictive coding of the visual data In very low bit rate applications, coding of video frames in terms of video objects within may require too much bandwidth, because the shape of such objects may consume a significant portion of the limited bit budget. In such cases, the sprite-based coding system conducts frame-based coding where automatic segmentation is only used to obtain better dominant motion estimation for sprite building and dominant motion-compensated prediction. The sprite-based encoding system can also generate a sprite that has a higher spatial resolution than the original images.

The sprite-based coding system is suitable for applications where camera view may change frequently, such as video conferencing with multiple cameras, or a talk show captured with more thanone camera. In these applications, multiple sprites are built and used as needed. For instance, if a camera goes back and forth between two participants in front of two different backgrounds, two background sprites are built and used as appropriate. More specifically, when background A is visible, building of the sprite for background B and its use in coding is suspended until Background B appears again. The use of multiple sprites in this fashion is possible within the MPEG-4 framework, as described below.

A sprite is built during the encoding process. However, the resulting sprite may be subsequently used, after coding, as a representative image of the compressed video clip. Its features can be used to identify the features of a video clip, which is then used in feature-based (or content-based) storage and retrieval of video clips. Hence sprite-based coding, according to another embodiment of the invention, is used to populate a video library of bitstreams or decoded images where sprite images generated during the encoding process act as representative images of the video clips. The mosaics can also be coded using a still image coding method.

In a similar fashion, one or several event lists may be associated with a background sprite. A possible choice for an event list is the set of consecutive positions of one or several vertices belonging to each foreground objects. Such a list is then used to generate token representative images of the foreground object position in the sprite. Consecutive positions of each vertex are then either linked by a straight line or share a distinct color. The consecutive positions of the vertex are then shown statically (all successive positions in the same sprite) or dynamically (vertex positions shown in the mosaic successively in time). A vertex is chosen to correspond to any distinctive feature of the foreground object, such as the center of gravity or a salient point in the shape of the object. In the latter case, and if several vertices are used simultaneously, the vertices are arranged according to a hierarchical description of the object shape. With this technique, a user or a presentation interface has the freedom to choose between coarse to finer shapes to show successive foreground object positions in the background sprite. This concept may be used in a video library system to retrieve content based on motion characteristics of the foreground object(s).

The mosaic can also be warped at a fixed zooming factor to provide more resolution than the images used to generate the mosaic. An optimal view point for the mosaic is provided by locating an optimized center reference frame instant and then building the mosaic around the reference frame instant.

The foregoing and other objects, features and advantages of the invention will become more readily apparent from the following detailed description of a preferred embodiment of the invention, which proceeds with reference to the accompanying drawings.

BRIEF DESCRIPTIONS OF THE DRAWINGS

FIG. 1 illustrates the buffers used in the sprite-based encoder according to the invention at time t−1.

FIG. 2 illustrates the buffers used in the sprite-based encoder at time t to t+1.

FIG. 3 illustrates the buffers used in the sprite-based encoder at time t+1 to =t+2.

FIGS. 4A–4E show a flow diagram describing operation of the sprite-based encoder illustrated in FIGS. 1–3.

FIG. 5 is a functional block diagram of the sprite-based encoder.

DETAILED DESCRIPTION OF THE PREFERRED EMBODIMENTS

The sprite-encoder system progressively learns to dissociate foreground from background while building a background mosaic at the same time. Once an initialization step (step 1) is complete, steps 2 to 11 described below are repeated until the construction of the background is complete or until it is aborted. The meaning of a region as referred to below is either a single set of contiguous pixels or alternatively several disconnected sets of contiguous pixels in the image. The single region or the union of these disconnected regions are referred to interchangeably as a region.

The notations are as follows: $I(s,t)$ denotes the content of video frame at spatial position s and at time t. $W_{t \leftarrow (t-1)}(I(s,t-1))$ denotes a warping operator which maps the image at time (t−1) to time t. For a given pixel location so in a video buffer at time t, this warping operation is performed by copying the pixel value at corresponding location s in frame (t−1). The correspondence between location so and location s is established by a particular and well defined transformation such as an affine or a perspective transformation, which are well known to those skilled in the art. $\Im_x(s,t)$ is an indicator buffer, say for quantity $_x$, denotes a particular state related to x at any pixel location a within the image at time t.

Thresh is a threshold value. The operations ≦Thresh and >Thresh are symbolic and can represent complex thresholding operations.

The size (per color component) of the current image frame $I(s,t)$ is $M_t \times N_t$ and the size of the previous compressed/decompressed same after warping, $W_{t \leftarrow (t-1)}(C^{-1}C\{I(s,t-1)\})$, is such that it can be inscribed in a rectangular array of $M_{t-1} \times N^{t-1}$ pixels. A sprite $M(s,t)$ is an image intensity (texture) buffer of size $M_m \times N_m$ per color component. The field $\Im_{mosaic}(s,t)$ is a single component field of the same size.

Referring now to FIGS. 1–4, a mosaic of the background is built as follows. The construction of the sprite is started at time t. The image $I(s,t-1)$ has already been compressed and decompressed and is available in both the encoder and the decoder. In the following steps, the image content is assumed to have a background and a foreground part which are transmitted as separate video objects (or VOs).

Figure 4A:
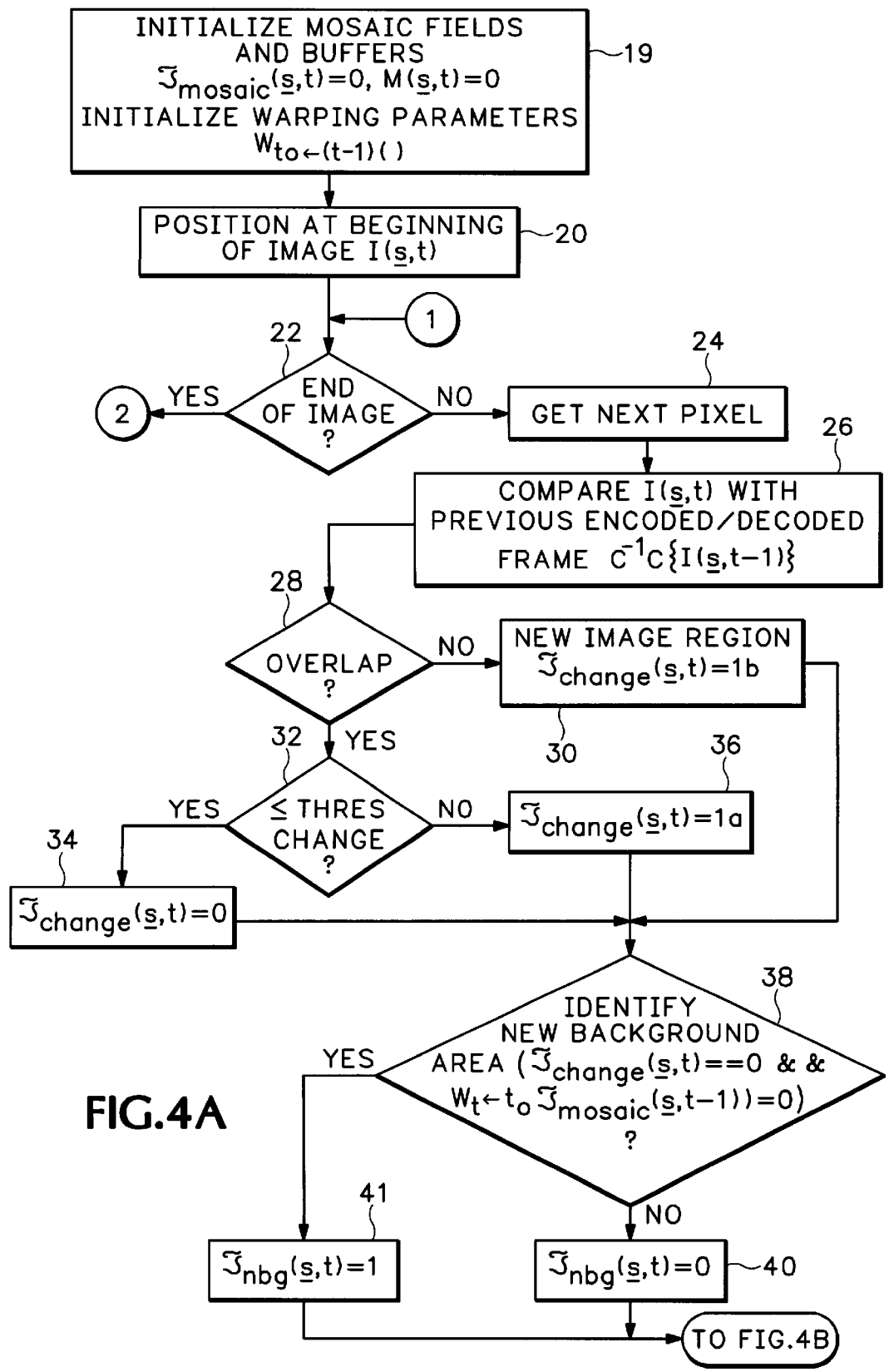
Figure 4B:
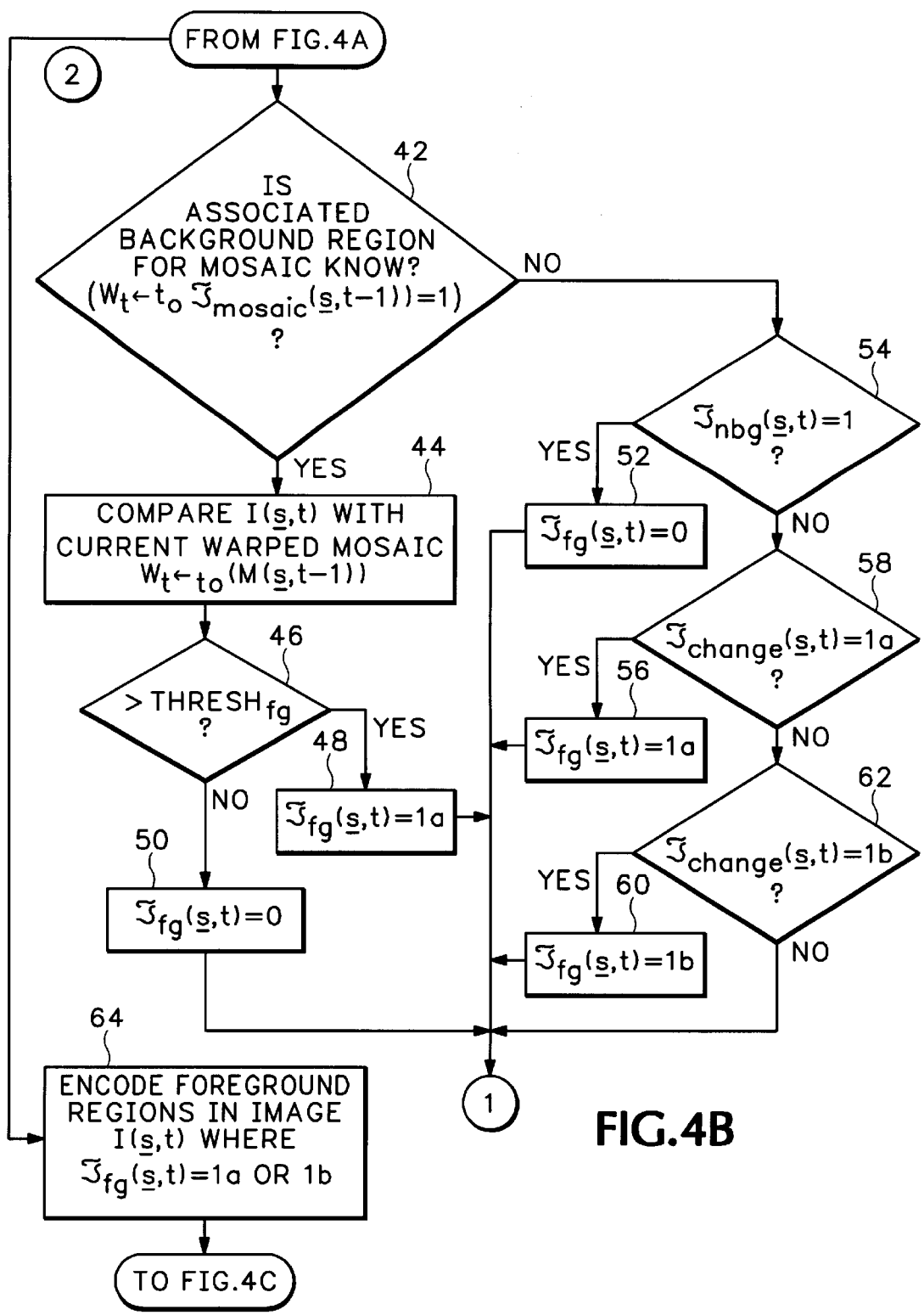
Figure 4E:
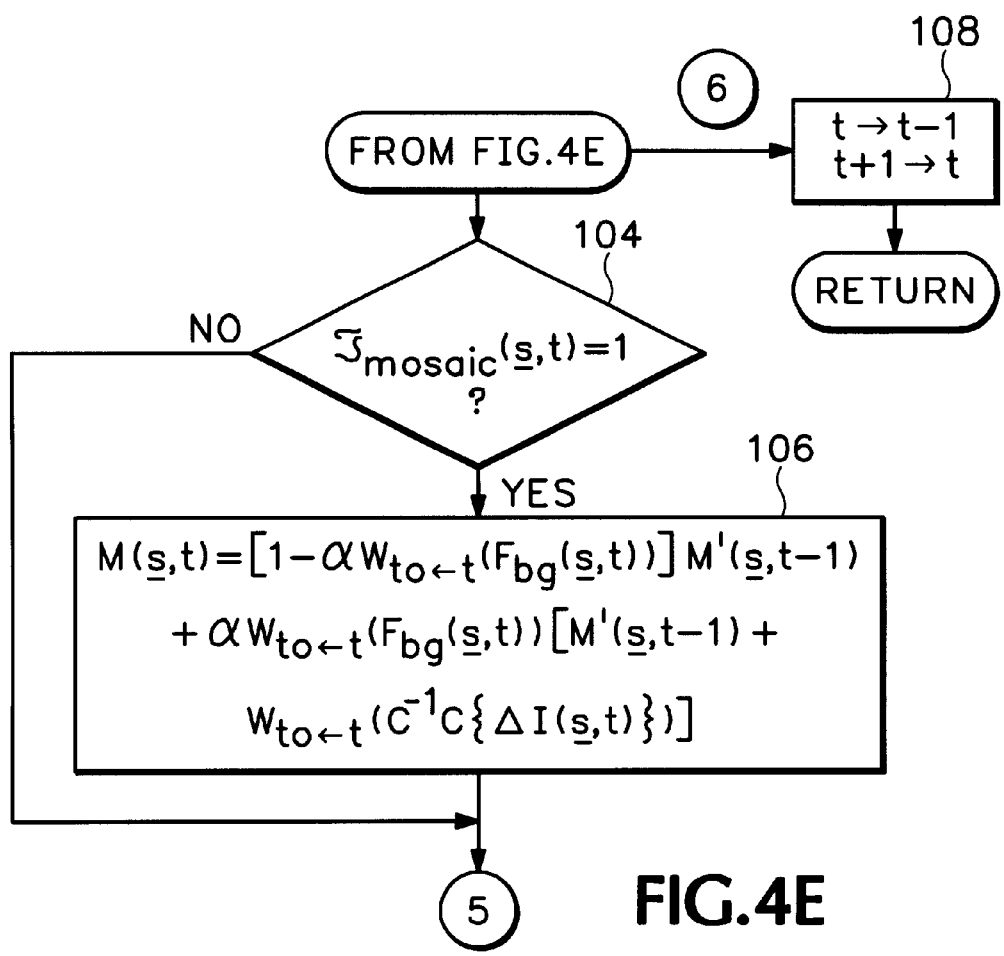

FIG. 1 illustrates steps 1 through 11 from time t−1, the instant when mosaic building is initiated, to time t when the new video frame or field has been acquired FIGS. 2 and 3 illustrate steps 2 through 11 from time t to t+1 and from time t+1 to t+2, respectively. FIG. 4 shows the operations performed by the sprite-based encoder during steps 1–11.

At the top left corner in each of these FIGS. 1–3 is shown a newly acquired video frame (A) which is compared to the previous video frame (B) (next image field to the right), once it has been coded/decoded and warped (step 2). Step 3 is illustrated by the right most image field (C) in the first row of FIGS. 1–3. This field shows the area where content change has been detected. The status of the mosaic buffer at time t (before updating occurs) is shown in the leftmost image field in the second row (D). The buffer (E) is used to identify the new background areas as described in step 4 below. These areas correspond to regions where background was not known until now.

Foreground identification is illustrated by the rightmost image in the second row (F). The operations associated with this image (F) that use the change map, the mosaic indicator buffer and the new background areas to define the foreground are described in step 5. The two leftmost image fields in the third row (G, H) illustrate steps 6 and 7 of the invention, respectively. In H, background shape information comes from the coded/decoded foreground shape information obtained in G. Finally, the mosaic updating process is illustrated by the image field (I) in the bottom right corner. This process takes place in steps 8,9,10 and 11 of the sprite-based encoding process.

Step 1: Initialization.

In operation 19 in FIG. 4, the binary field $\Im_{mosaic}(s,t)$ is initialized to 0 for every position a in the buffer, meaning that the content of the mosaic is unknown at these locations. The content of the mosaic buffer $M(s,t)$ is initialized to 0. The warping parameters from the current video frame I(s, t−1) to the mosaic are initialized to be $W_{t0 \leftarrow (t-1)}(any)$, t0 here representing an arbitrary fictive time. This initial warping is important as it provides a way to specify the "resolution" or the "time reference" used to build the mosaic. Potential applications of this initial mapping are making a mosaic with super spatial resolution or selection of an optimal time t0 minimizing the distortion introduced by the method as described in further detail below. A super spatial resolution mosaic is a mosaic with increased resolution compared to the original individual images in the sequence.

Step 2: Acquisition.

The image $I(s,t)$ is acquired and the forward warping parameters for mapping the image $I(s,t-1)$ to $I(s,t)$ are computed. The number of warping parameters as well as the method for estimating these parameters are known to those skilled in the art and are therefore not specified here. For example, a dominant motion estimation algorithm such as the one given in J. Bergen et al., "A three-fame algorithm for estimating two-component image motion," IEEE Trans. Pattern Anal., Mach. Intel., Vol. 14, pp. 886–896, September 1992. may be used. The warping parameters are composed with the current warping parameters, resulting in the mapping $W_{t \leftarrow t0}(any)$.

These parameters are transmitted to a decoder either directly or indirectly in the form of a series of coded vertex coordinates. The sprite-based encoder is positioned at the beginning of the image frame I(s,t) in operation 20 in FIG. 4 and the first pixel in the image frame is obtained in operation 24.

Step 3: Detect Change in Content between Previously Coded/Decoded Frame and Current Frame.

i) Initialization of a large buffer of size $M_b \times N_b$ greater than the image ($M_b > M_t, N_b > N_t$) and possibly as large as the mosaic. The buffer is initialized to 3 to indicate unknown status.

$$\Im_{change}(s,t)=3$$

ii) In operations 26, 28, 32, 34 and 36 in FIG. 4, scene changes (motion compensated) are computed over common image support. Give label 0 to all locations where change in content is deemed small (34). Give label 1a to locations where change is detected to be large (36). To make regions more homogeneous, implement additional operations (e.g. morphological operations) which either reset label from 1a to 0 or set label from 0 to 1a Regions labeled 0 will typically be considered and coded as part of the background Video Object while regions labeled 1a will typically be encoded as part of the foreground Video Object.

$$\mathcal{F}_{change}(s,t) = \begin{cases} 0 & \text{if } |I(s,t) - W_{t \leftarrow t-1}(C^{-1}C\{I(s,t-1\_)\})| \leq Thres_{change} \\ 1a & \text{otherwise} \end{cases}$$

where $Thres_{change}$ denotes a predefined threshold value.

iii) In operations 28 and 30 in FIG. 4, new image regions are tagged, where support of image at time t does not overlap with support of image at time (t−1), as Step 4: Identify New Background Areas.

$$\Im_{change}(s,t)=1b$$

In operations 38, 40 and 41 in FIG. 4, a new background area is detected if there has not been any change in image content in the last two video frames. The corresponding area in the mosaic must also indicate that the background at this location is unknown. The resulting new background area is then pasted to any neighboring regions where background is known. As will be seen in later steps, incorporation of new background data into the mosaic must be done according to compressed/de-compressed background shape information to avoid any drift between encoder and decoder.

$$\mathcal{F}_{nbg}(s,t) = \begin{cases} 1 & \text{if } ((\mathcal{F}_{change}(s,t) = 0) \&\& (W_{t \leftarrow t0}(\mathcal{F}_{mosaic}(s,t-1)) = 0)) \\ 0 & \text{otherwise} \end{cases}$$

Here, the indicator value 0 means that the background is unknown.

Step 5: Perform Foreground/Background Segmentation.

Operations 42, 44, 46, 48 and 50 in FIG. 4, first look at regions where the background is known ($\Im mosaic(s,t-1)=$ 1). Thresholding is performed (46) to distinguish the foreground from the background (case (i)). For regions where background is not known, operations 56–62 tag as foreground any regions where changes have occurred (label 1a and 1a defined in step 3) (cases (iii) and (iv)). Operations 52 and 54 in case (ii) represents new background areas that are excluded from being part of the foreground.

i) If $W_{t \leftarrow t0}(\mathcal{F}_{mosaic}(s,t-1)) = 1$ $$\mathcal{F}_{fg}(s,t) = \begin{cases} =1a & \text{if } |I(s,t) - W_{t \leftarrow t0}(M(s,t-1))| > Thresh_{fg} \\ =0 & \text{otherwise} \end{cases}$$

where $Thres_{fg}$ is a pre-defined threshold value, which is used here to segment foreground from background.

ii) else if $\Im_{nbg}(s,t)==1$ $\Im_{fg}(s,t)=0$ iii) else if $(W_{t \leftarrow t0}(\Im_{mosaic}(s,t-1)==0) \&\& (\Im_{change}(s,t)==1a))$ $\Im_{fg}(s,t)=1a$ iv) else $(W_{t \leftarrow t0}(\Im_{mosaic}(s,t-1)==0) \&\& (\Im_{change}(s,t)==1b))$ $\Im_{fg}(s,t)=1b$ In cases (iii) and (iv), a sub-classification of the regions tagged as 1 into either regions 1a and 1b is used for the sole purpose of providing the encoder with the flexibility to follow different macroblock selection rules. For example, regions tagged as 1a might be preferably coded with inter-frame macroblocks since these regions occur over common image support. On the other hand, regions tagged as 1b might preferably be coded with intra-frame macroblocks since these regions do not share a common support with the previous frame. These regions can be tagged as regions "1" if such distinction does not need to be stored or is not used by the encoder.

The sprite-based encoder then jumps back to operations 22 and 24 in FIG. 4. The next pixel is then obtained for the image frame and steps 3, case ii) −5 are repeated for the next pixel.

Step 6: Compress/Decompress Foreground Shape and Texture.

After all pixels in the image frame have been analyzed, and applicable pixels tagged as foreground or background regions, the sprite-based encoder jumps to operation 64 in FIG. 4. A conventional (I, P or B-VOP) prediction mode is used to encode foreground regions labeled as 1a and 1b. In the case of P or B-VOPs, individual macroblocks can either use inter-frame prediction or intra-frame coding. The pixels corresponding to regions labeled 1b (which can include revealed background not represented in mosaic) are preferably coded as intra macroblocks.

The shape of the foreground is compressed and transmitted as well. Once de-compressed, this shape is used by the encoder and decoder to update the content of the mosaic. This process can be performed using a standard MPEG-4 VM version 9.0 encoding technique such as described in "MPEG-4 Video Verification Model Version 9.0", Document ISO/JEC JTC1/SC29/WG11/N1869. The sprite-based encoder is then positioned at the beginning of the coded/decoded foreground shape in operation 6 and the first pixel of the shape bitmap is obtained in operation 70 of FIG. 4.

Step 7: Get Background Shape.

In operations 72–76 in FIG. 4, the background shape is then obtained from the compressed/de-compressed foreground shape. Compression/De-compression is necessary here to ensure that encoder and decoder share the same shape information.

$$\tilde{F}_{bg}(\underline{s}, t) = \begin{cases} 1 & \text{if } C^{-1}C\{\tilde{F}_{fg}(\underline{s}, t) = 0\} \\ 0 & \text{otherwise} \end{cases}$$

where $C^{-1}C\{\ \}$ denotes shape coding/decoding which is performed using standard MPEG-4 coding techniques as described above.

Step 8: Initialize New Background Texture in Mosaic.

Operations 78–84 in FIG. 4 identify where new background has occurred and initialize mosaic with content found in previous video frame (time (t−1)). Note that the field $\Im_{nbg}(s,t)$ cannot be used here since this information is unknown to the decoder.

$$M'(\underline{s}, t-1) = \begin{cases} M(\underline{s}, t-1) & \text{if } (\tilde{F}_{mosaic}(\underline{s}, t-1) = 1) \\ W_{t0\leftarrow(t-1)}(C^{-1}C\{I(\underline{s}, t-1)\}) & \text{if } ((W_{t0\leftarrow t}(\tilde{F}_{bg}(\underline{s}, t)) = 1) \,\&\&\, (\tilde{F}_{mosaic}(\underline{s}, t-1) = 0)) \end{cases}$$

Step 9: Calculate Background Texture Residuals from Mosaic Prediction.

If $\Im_{bg}(s,t)==1$ in operation 86, a difference signal is calculated by using mosaic content as a predictor. The resulting MT(s,t) calculated in operation 88, is used to compute the difference signal. In operations 68 and 70 in FIG. 4, the sprite-based encoder repeats steps 7–9 above for each identified foreground image pixel. The difference signal over each macroblock is compared to conventional difference signals produced by using prediction from the previous and the next video frame (P or B prediction mode). The macroblock type is selected according to the best prediction mode. The residual signal is transmitted to the decoder along with the compressed background shape as described in "Result of N3 Experiment Using Unified S2/N3 Syntax", Regis J. Crinon and Ibrahim Sezan, Document ISO/IEC-JTC1/SC29/WG11/M1404.

$$\Delta I(s,t) = I(s,t) - W_{t\leftarrow t0}(M'(s,t-1))$$

Operations 90 and 92 in FIG. 4 encodes background regions in the image I(s,t) where $\Im_{bg}(s,t)==1$ and then start subsequent processing at the beginning pixel of the mosaic.

Step 10: Update Background Shape in Mosaic.

Operations 98–104 in FIG. 4 update the mosaic indicator map to include the shape of the new background.

$$\tilde{F}_{mosaic}(\underline{s}, t) = \begin{cases} 1 & \text{if } \tilde{F}_{mosaic}(\underline{s}, t-1) = 1 \\ 1 & \text{if } ((W_{t0\leftarrow t0}(\underline{s}, t)) = 1) \,\&\&\, (\tilde{F}_{mosaic}(\underline{s}, t-1) = 0)) \\ 0 & \text{otherwise} \end{cases}$$

Step 11: Update Mosaic

Operations 104 and 106 in FIG. 4 update content of the mosaic in regions corresponding to new or non-covered background in frame t.

$$M(s,t) = [1 - \alpha W_{t0\leftarrow t}(\Im_{bg}(s,t))]M'(s,t-1) + \alpha W_{t0\leftarrow t}(\Im_{bg}(s,t))[M'(s,t-1) + W_{t0\leftarrow t}(C^{-1}C\{\Delta I(s,t)\})]$$

The selection of the value of the blending parameter a (0<α<1) in the above equation is application dependent. The sprite-based encoder then jumps back to operations 94 and 96 and processes the next pixel of the mosaic. After all background regions have been updated, the segmentation process described above in steps 2–11 is repeated for the next image frame acquired in operation 108.

The method described above builds the mosaic with reference to time t0, which can be a time instant in the past or can be the current time or a future time instant. It is straightforward to rewrite the above equations for the case where the mosaic is continuously warped to the current time instant t.

Referring to FIG. 5, a block diagram of the sprite-based encoder 109 is depicted. The purpose of this drawing is to highlight the dependencies in the various components and quantities used by the method of the invention. It also emphasizes the various warping and un-warping stages that are necessary to align consecutive video fields.

The current image to be encoded 114 is used along with the previous original image 110 to estimate the global motion (warping) parameters in 116. The output of estimator 116 is transmitted over a communication channel 122 (the encoding of these parameters can take various forms including a series of coded vertex coordinates). The output of estimator 116 is also passed to a warping block 120 which compose (computes accumulated) warping transformations in time. A map indicating regions to be updated 128 and initialized new background 130 are used for generating a background mosaic 134. The image 144 which represents image 114 once it has been segmented into foreground and background regions, is generated from the warped background mosaic buffer 136, the warped mosaic indicator map 138 and identified new background regions 150.

A background shape signal and background update pixel values 164 are generated from the input image 114, the warped mosaic 136, uncovered background in the previous encoded/decoded image 158 and the encoded/decoded foreground shape of the new image 114 being encoded. The coded background shape and texture residuals 166, the coded foreground shape and texture 170 are transmitted in block 172. The contents from block 172 are decoded in block 156 and warped in block 152 and 154. The decoded, warped, previous image from block 152 and the foreground/background-segmented picture 144 are used to calculate the foreground residual signal in block 160. Uncovered background regions are identified in block 158 from the warped decoded previous image generated in block 154 as well as from the current mosaic indicator map 124. The uncovered background regions 158 are used to initialize new mosaic regions in block 130 (this corresponds to the bottom equality in step 8 above).

A Mosaic-Based Video Conferencing and Videophone System.

Figure 6:
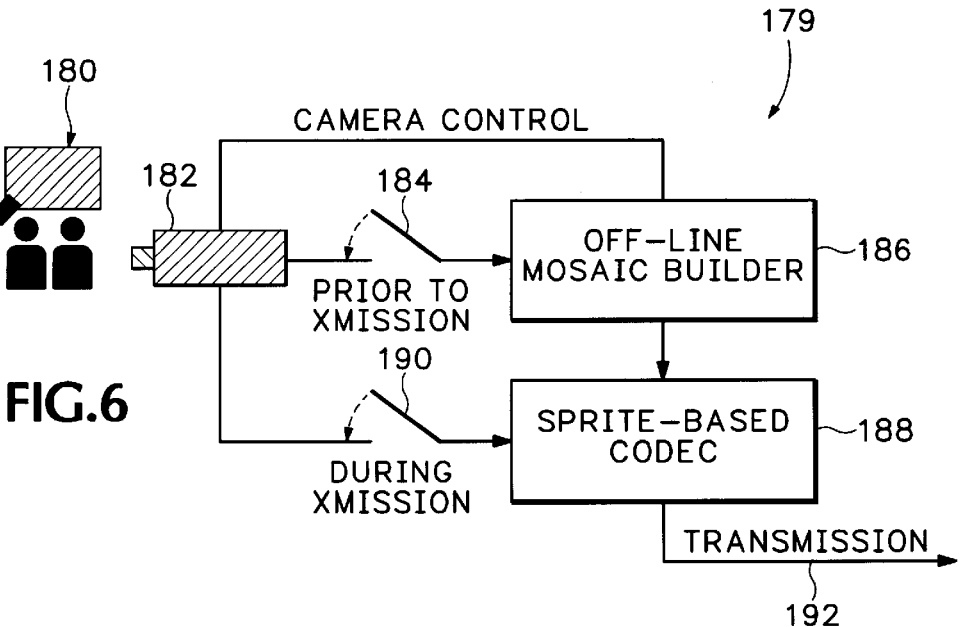
FIG. 6 is a diagram of a sprite-based video conferencing system according to another embodiment of the invention.

FIG. 6 shows a block diagram of a video conferencing system 179 that uses an off-line built background sprite as a dynamic sprite during transmission. Prior to transmission of encoded images, the encoding system 179 conducts a time adjustable configuration phase. During the configuration phase, a switch 190 disables sprite-based encoding of images 180 until an on-line background mosaic is built off-line by an off-line mosaic builder 186. By first building a background mosaic off-line, coding efficiency is increased because the mosaic can incorporate all the background regions that the videophone system need to represent in the course of the conversational transmission between the two end users.

Prior to transmission, a switch 184 connects a video camera 182 to the off-line mosaic builder 186. Small displacements of a foreground object, such as the head and shoulders of image 180 are used to build a background mosaic. The head displacements allow the off-line mosaic builder 186 to identify and build the background image behind the head and shoulders. The displacements of the foreground are voluntary where the system 179 directs the foreground in image 180 to move in different directions until a substantially complete background mosaic is derived in mosaic builder 186. Alternatively, the system 179 does not direct the user to move in different directions reducing gain in coding efficiency. The sprite-base encoding technique described above in steps 1–11 is used to build the background mosaic.

The sprite-based codec 188 then uses the mosaic during video transmission as a dynamic sprite with the blending factor set to 0 to prevent any updating of the mosaic. In this case, macroblock types may be dynamic or static. In one extreme case, all macroblocks are static-type macroblocks meaning that the background mosaic is used as a static sprite. In another extreme case, all macroblocks are dynamic and the mosaic is being used as a dynamic (predictive) sprite. This later case requires a higher data transmission bandwidth.

A Mosaic-Based Video Database

Figure 7:
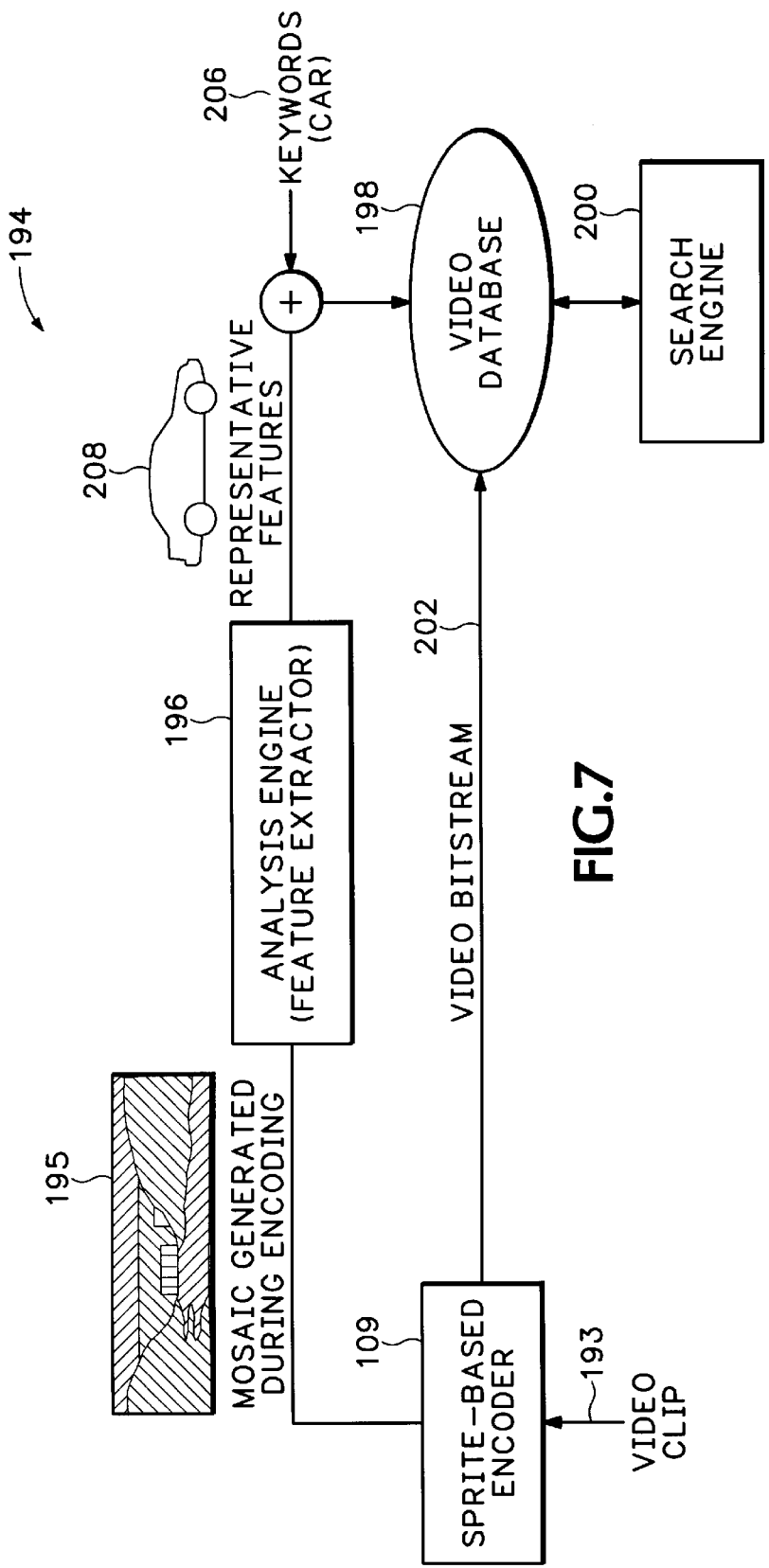
FIG. 7 is a block diagram of a sprite-based video search system according to another embodiment of the invention.

Referring to FIG. 7, a sprite-based video search system 194 uses the sprite-based encoder 109 to populate and search a database 198 of video bitstreams 202, i.e., a database of compressed bitstreams. The sprite-based encoder 109 compresses video clips 193 using the sprite-based encoding technique described above in steps 1–11. Features of the video clips 193 can no longer be visually identified in the compressed bitstream 202. Thus, a user would have to decompress the video bitstream 202 for all video clips 193 until the correct video clip is located.

However, the sprite-based encoder 109 generates both the compressed bitstream 202 and a mosaic 195 generated during the encoding process. The mosaic image 195 is used as a representative image of the video clip bitstream 202. The features in mosaic 195 are then analyzed, and representative features 208 are extracted by an analysis engine 196. The representative features 208 are inserted along with the video bitstream into a video database 198. A search engine 200 is then used to index and retrieve the bitstream 202 belonging to that video clip 193. Thus, video clips can be located more quickly without decoding each compressed video bitstream 202. Databases and search engines are known to those skilled in the art and are therefore not described in further detail.

Figure 8:
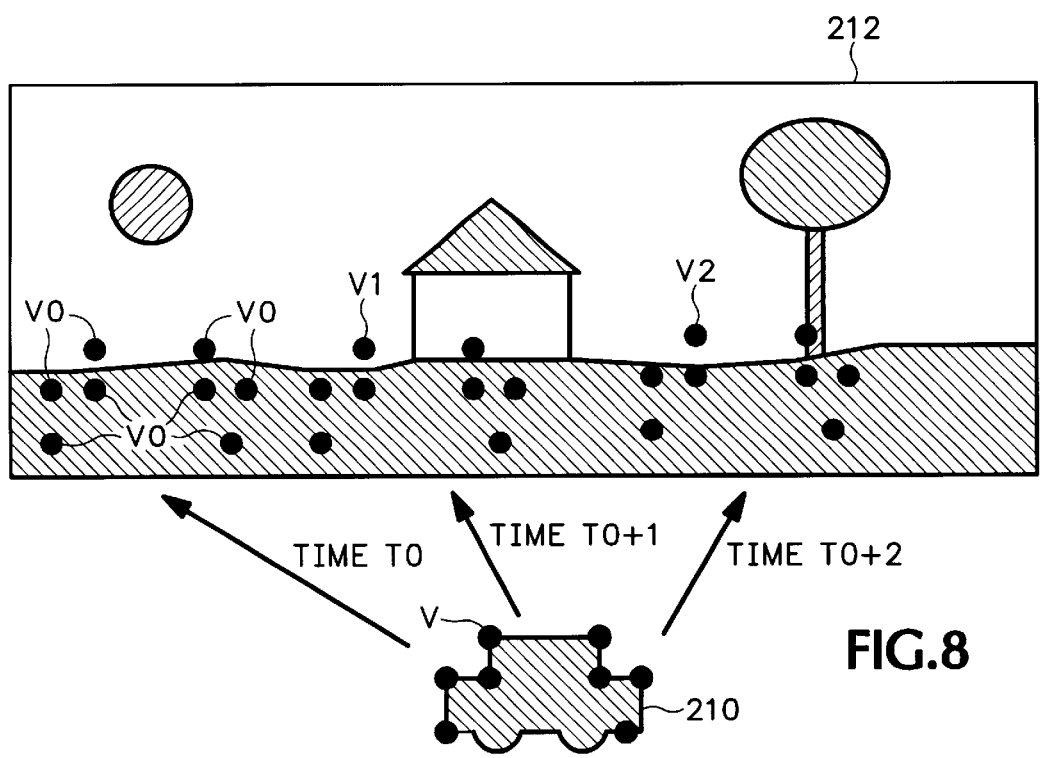
FIG. 8 shows how consecutive portions of a foreground object may be represented in a mosaic according to yet another aspect of the invention.

FIG. 8 shows an example of how consecutive positions of a foreground object (here a car) are represented in a mosaic by plotting the successive positions of one or several salient points (V) belonging to the shape of the foreground object. The vertices are referred to as V0 at time t0, V1 at time t0+1 and V2 at time t0+2 to avoid any confusion.

The identified motion trajectory in the mosaic 212 provide the additional benefit of facilitating motion-based retrieval since the motion of the foreground is represented in mosaic reference space.

Motion trajectory of the foreground object 210 is overlaid on top of the mosaic 212 to provide a rough description of foreground motion in the sequence. Trajectory of the foreground object 210 at points V0, V1 and V2, each represent the position of the foreground object 210 at a given instant in time. The feature points V0–V2 can be salient vertices of the object shape. A hierarchical description of object shape would bring the additional advantage of allowing the database interface to overlay from coarse to fine shape outlines in the mosaic. For example, more detailed vertices would allow a user to not only search for a vehicle going from left to right but also identify the vehicle as a car.

The background mosaic is comprised of the grass, sky, sun and tree. The foreground object is a car 210 subject to an accelerated motion and moving from left to right. Eight vertices "V" show the shape of the car. The consecutive positions of the car are represented in the mosaic 212 by simply plotting the vertices V at their successive positions V0, V1 and V2. In this example, the vertices V0–V2 are shown statically in the mosaic 212 and they capture one level of shape description only.

Consecutive vertex positions V0, Vi and V2 can be shown together in the same background mosaic 212 as shown in FIG. 8 or could be displayed successively in time with the same mosaic support.

In addition, the mosaic 212 can be used as an icon. By clicking on the mosaic icon, a user triggers playback of the sequence in video database 198 (FIG. 7). The user could alternatively query with keywords 206 (FIG. 7) a search related to motion of foreground objects. For example, search "CAR MOVING FROM LEFT TO RIGHT". The representative feature of a car and left to right motion are extracted by the analysis engine 196 (FIG. 7) according to the vertices shown in FIG. 8.

Support of Multiple Mosaics in Applications with Frequent Scene Changes.

In the case where the video sequence includes rapid and frequent changes from one scene to another, as may be the case in video conferencing applications, two or more mosaics are built simultaneously depending on the number of independent scenes. Having more than one mosaic does not force the system to re-initiate the building of a new mosaic each time a scene cut occurs. In this framework, a mosaic is used and updated only if the video frames being encoded share similar content. More than one mosaic can be updated at the same time since mosaics are allowed to overlap.

Generating Mosaic from an Optimal Viewpoint.

In another embodiment of the invention, the warping parameters are selected to optimize image viewing characteristics of the mosaic. The arbitrary mapping $W_{t0\leftarrow(t-1)}()$ is initialized at the beginning of the sprite-based encoding initialization in step 1 to provide the optimal spatial representation domain for the mosaic where distortion and artifacts are minimized.

For example, it may be desirable to view some images more to the left or more to the right of an object center point. This occurs for instance with a building that has two connecting walls that diverge away from the viewer in different directions. If one wall is substantially longer than the other connecting wall, it may be desirable to skew the center reference point of the mosaic toward the longer wall. Thus, the mosaic will present a better representation of the entire building.

The warping parameters are initialized to a center reference point $W_{t0\leftarrow(t-1)}(any)$, t0 here representing a reference time taken at an optimal viewing point of the object. Some methods for identifying the optimal reference point include a viewer reviewing a preliminary mosaic and tagging a reference frame, dynamically tagging the reference frame during image capture or by the system automatically shifting a reference point according to the number of images taken from each side of the object.

Improved Resolution

The arbitrary mapping $W_{t0\leftarrow(t-1)}$(any) can include a zooming factor, which has the effect of building a mosaic whose resolution is potentially 2,3 or N times larger than the resolution of the video frames used to build it. The arbitrary fixed zooming factor provides a mechanism by which fractional warping displacements across consecutive video frames are recorded as integer displacements in the mosaic. The larger the zooming factor, the longer the sequence must be before the mosaic can be completed (more pixel locations to fill up). The MPEG-4 framework allows the implementation of such a scheme.

We denote this arbitrary mapping $W_{res}$(any). In the linear case, the operator can be reduced to the identity matrix multiplied by a constant scalar greater than 1 if the zooming factor is identical along a horizontal and vertical dimensions. This scaling factor defines the enlargement factor used for the mosaic. The mosaic update equation shown in step 11 is re-written as follows.

$$M(s,t)=[1-\alpha W_{res}(W_{t0\leftarrow t}(\Im_{bg}(s,t)))]M'(s,t-1)+\alpha W_{res}(W_{t0\leftarrow t}(\Im_{bg}(s,t)))[M'(s,t-1)+W_{res}(W_{t0-t}(C^{-1}C\{\Delta I(s,t)\}))]$$

This equation shows that the mosaic is being built at the fixed time t0 which can be the time corresponding to the first video frame, the time corresponding to the final frame or any other time in between. In this case, the arbitrary mapping $W_{res}$(any) is always composed with the warping transformation $W_{t0\leftarrow t}$. When the mosaic is continuously warped toward the current video frame, the update equation must be re-written as follows:

$$M(s,t)=[1-\alpha(\Im_{bg}(s,t))]W_{t\leftarrow(t-1)}(M'(s,t-1))+\alpha(\Im_{bg}(s,t))[W_{t\leftarrow(t-1)}(M'(s,t-1))+W_{res}(C^{-1}C\{\Delta I(s,t)\})]$$

The equation above shows that the arbitrary mapping $W_{res}$(any) is no longer composed with the frame-to-frame warping operator $W_{t\leftarrow(t-1)}$ but instead applied to the compressed/de-compressed residuals. In MPEG-4, the arbitrary operator $W_{res}$(any) can be transmitted with appropriate extension of the syntax, as the first set of warping parameters.

Coding of Video Sequences at Very Low Bit Rates.

In very low bit rate applications, the transmission of shape information may become an undesirable overhead The method described above can still operate when transmission of shape information is turned off. This is accomplished by setting background shape to one at every pixel (step 7) and setting the blending factor $\alpha$ to 1 (step 11). The latter setting guarantees that the mosaic will always display the latest video information, which is a necessity in this situation since foreground is included in the mosaic. In this situation, the macroblock types can be either intra, inter, static sprite or dynamic sprite. The sprite is being used as a static sprite if all macroblocks are of type static. This is the most likely situation for a very low bit rate application since no residual is transmitted in this case. The sprite is being used as a dynamic sprite if all macroblocks are of type dynamic.

Having described and illustrated the principles of the invention in a preferred embodiment thereof, it should be apparent that the invention can be modified in arrangement and detail without departing from such principles. We claim all modifications and variation coming within the spirit and scope of the following claims.

What is claimed is:

1. A video retrieval system where sprites built during image encoding are used as representative images of input video clips are analyzed and indexed for storage and retrieval purposes, comprising:

a sprite-based encoder for receiving video clips and generating from the video clips a video bitstream and a mosaic after the video bitstream has been generated;

a feature extractor for extracting features of the video clip from the mosaic, and for identifying representative ones of the extracted features;

a video database for storing and organizing video bitstreams and their associated identified representative features; and a search engine for searching the video database for the mosaic containing the representative features and then retrieving the mosaic and video clip that generated the mosaic with the representative features.

2. The system of claim 1, wherein an analysis engine generates vertices belonging to foreground objects in the mosaic.

3. The system of claim 2, wherein vertices are arranged according to a hierarchical description of the object shape.

4. The system of claim 2, wherein consecutive positions of the vertices are shown at successive positions in the same mosaic or successively in time on the mosaic.

5. The system of claim 4, wherein the consecutive positions of the vertices are identified as representative features by the analysis engine and used by the search engine to identify video bitstreams in the video database.

6. The system of claim 5, wherein the vertices are chosen to correspond to at least one feature of the foreground object.

7. The system of claim 6, wherein the feature is a center of gravity in the shape of the object.

8. The system of claim 6, wherein the feature is a salient point in the shape of the object.

* * * * *

UNITED STATES PATENT AND TRADEMARK OFFICE
CERTIFICATE OF CORRECTION

PATENT NO. : 6,259,828 B1
DATED : July 10, 2001
INVENTOR(S) : Crinon et al.

It is certified that error appears in the above-identified patent and that said Letters Patent is hereby corrected as shown below:

Column 3,
Line 27, "t+1 to =t+2" should read -- t+1 to t+2 --
Line 58, "location so in a" should read -- location $\underline{s}_0$ in a --
Line 61, "location so and" should read -- location $\underline{s}_0$ and --
Line 66, "related to x at any" should read -- related to $\underline{x}$ at any --
Line 66, "pixel location a within the" should read -- pixel locations $\underline{s}$ within the --

Column 4,
Line 6, "compressed/decompressed same after" should read -- compressed/decompressed frame after --
Line 8, "array of $M_{t-1}$ x $N^{t-1}$ pixels" should read -- array of $M_{t-1}$ x $N_{t-1}$ pixels --
Line 51, "every position a in the buffer" should read -- every position $\underline{s}$ in the buffer --

Column 5,
Line 39, "t-1_{" should read -- t-1){ --
Lines 39-40 and 62-63, the symbol " $F$ " should be replaced with -- $\mathcal{T}$ -- in the formula
Line 47, the section heading "Identify New Background Areas." should follow the formula $\mathcal{T}_{change}(\underline{s},t) = 1b$ Column 6,
Lines 3 and 20-27, the letter "s" should be underlined -- $\underline{s}$ -- in the formulas
Line 9, "and 1a defined" should read -- and 1b defined --
Lines 13-16, the symbol " $F$ " should be replaced with -- $\mathcal{T}$ -- in the formula
Line 64, "ISO/JEC" should read -- ISO/IEC --
Line 66, "operation 6 and" should read -- operation 66 and --

Column 7,
Lines 6-9, 20-28 and 56-57, the symbol " $F$ " should be replaced with -- $\mathcal{T}$ -- in the formula
Lines 19, 31, 46 and 64-65, the letter "s" should be underlined -- $\underline{s}$ -- in the formulas
Line 33, "MT(s,t)" should read -- $\Delta I(\underline{s},t)$ --
Line 49, "(s,t)" should read -- $(\underline{s},t)$ --
Lines 66-67, "a (0<α<1)" should read -- α (0<α<1) --

Column 10,
Line 19, "Vi" should read -- V1 --
Line 47, "$W_{to} \leftarrow_{(t-1)}$ ( )" should read -- $W_{to} \leftarrow_{(t-1)}$ (any) --

UNITED STATES PATENT AND TRADEMARK OFFICE
CERTIFICATE OF CORRECTION

PATENT NO. : 6,259,828 B1
DATED : July 10, 2001
INVENTOR(S) : Crinon et al.

It is certified that error appears in the above-identified patent and that said Letters Patent is hereby corrected as shown below:

Column 11,
Lines 22-23 and 33-34, the letter "s" should be underlined -- s -- in the formulas Column 12,
Line 38, "positions in the same" should read -- positions on the same --

Signed and Sealed this

Eighth Day of April, 2003

JAMES E. ROGAN
*Director of the United States Patent and Trademark Office*